United States Patent
Yang et al.

(10) Patent No.: US 9,734,385 B2
(45) Date of Patent: Aug. 15, 2017

(54) TRANSFORMED REPRESENTATION FOR FINGERPRINT DATA WITH HIGH RECOGNITION ACCURACY

(71) Applicant: Cross Match Technologies, Inc., Palm Beach Gardens, FL (US)

(72) Inventors: Bian Yang, Gjovik (NO); Guoqiang Li, Gjovik (NO)

(73) Assignee: Cross Match Technologies, Inc., Palm Beach Gardens, FL (US)

(*) Notice: Subject to any disclaimer, the term of this patent is extended or adjusted under 35 U.S.C. 154(b) by 0 days.

(21) Appl. No.: 15/149,222

(22) Filed: May 9, 2016

(65) Prior Publication Data

US 2016/0358010 A1 Dec. 8, 2016

Related U.S. Application Data

(60) Provisional application No. 62/172,335, filed on Jun. 8, 2015.

(51) Int. Cl.
| | |
|---|---|
| *G06K 9/00* | (2006.01) |
| *G06F 17/30* | (2006.01) |
| *G06F 21/32* | (2013.01) |
| *H04L 9/32* | (2006.01) |

(52) U.S. Cl.
CPC ..... *G06K 9/00093* (2013.01); *G06F 17/3028* (2013.01); *G06F 17/30247* (2013.01); *G06F 17/30259* (2013.01); *G06F 21/32* (2013.01); *G06K 9/00067* (2013.01); *G06K 9/00073* (2013.01); *H04L 9/3231* (2013.01); *G06K 9/00013* (2013.01)

(58) Field of Classification Search
CPC .......... G06K 9/00093; G06K 9/00073; G06K 9/00067; G06K 9/0008; G06K 9/00013; G06F 17/30247; G06F 17/30259; G06F 17/3028; G06F 17/30784; G06F 21/32; H04L 9/3231

See application file for complete search history.

(56) References Cited

U.S. PATENT DOCUMENTS

| | | | | |
|---|---|---|---|---|
| 4,135,147 | A | * | 1/1979 | Riganati ............ G06K 9/00006 382/125 |
| 4,747,147 | A | * | 5/1988 | Sparrow ............ G07C 9/00158 382/125 |

(Continued)

*Primary Examiner* — Manav Seth
(74) *Attorney, Agent, or Firm* — Kenneth J. Lukacher Law Group

(57) ABSTRACT

The invention provides a computing device for processing fingerprint template data, wherein the computing device comprises modules configured for generating transformed fingerprint template data from original fingerprint minutiae template data, in which minutiae are represented at least by Cartesian or polar coordinates and an inherent minutiae direction, the computing device being configured to generate for each minutia of the original fingerprint minutiae data corresponding mega-vicinity data. The computing device may further comprise a comparator module being configured to compare two transformed fingerprint template data that comprises, for each minutia, mega-vicinity data of a first fingerprint and a second fingerprint. The computing device may further comprise a biometrics-secret binding module for protecting.

10 Claims, 6 Drawing Sheets

(56) References Cited

U.S. PATENT DOCUMENTS

| | | | | |
|---|---|---|---|---|
| 5,613,014 A * | 3/1997 | Eshera | ............... | G06K 9/00073 356/71 |
| 5,920,641 A * | 7/1999 | Ueberreiter | .............. | G06K 9/56 382/115 |
| 5,982,914 A * | 11/1999 | Lee | .................... | G06K 9/00073 382/124 |
| 6,778,687 B2 * | 8/2004 | Sanders | ............. | G06K 9/00087 382/124 |
| 8,300,904 B2 * | 10/2012 | Chen | ................. | G06K 9/00093 382/115 |
| 8,411,913 B2 * | 4/2013 | Zhang | ................ | G06K 9/00073 382/125 |
| 8,594,394 B2 * | 11/2013 | Bringer | .................. | G06K 9/001 358/1.2 |
| 9,367,728 B2 * | 6/2016 | Chiang | .............. | G06K 9/00073 |
| 2002/0168093 A1 * | 11/2002 | Sanders | ............. | G06K 9/00087 382/125 |
| 2004/0218791 A1 * | 11/2004 | Jiang | ................. | G06K 9/00087 382/124 |
| 2005/0232473 A1 * | 10/2005 | Liu | ........................ | G06K 9/001 382/124 |
| 2010/0150411 A1 * | 6/2010 | Bauchspies | ............ | G06K 9/001 382/125 |
| 2010/0266168 A1 * | 10/2010 | Wang | ..................... | G06K 9/001 382/124 |

* cited by examiner

TRANSFORMED REPRESENTATION FOR FINGERPRINT DATA WITH HIGH RECOGNITION ACCURACY

TECHNICAL FIELD

The herein proposed technical improvement concerns a new transformed representation of fingerprint data, provided by a new fingerprint minutiae data structure transformation for generating a redundant and reliable minutiae representation from a standard fingerprint minutiae template which provides for high recognition accuracy in both unprotected and protected forms.

BACKGROUND

In the biometric process of fingerprint scanning, a minutia is a specific biological characteristic in a fingerprint image. Basically, there are two main types of minutiae, known as ridge endings and ridge bifurcations; further known minutiae types are e.g. crossovers, islands, lakes, and spurs. For further details, reference may be made, for example, to R. Basal et al. in "Minutiae Extraction from Fingerprint Images—a Review", IJCSI International Journal of Computer Science Issues, Volume 8, Issue 5, Number 3, September 2011, ISSN (Online): 1694-0814. It is also possible to consider other fingerprint details as minutiae such as points at which scars begin or terminate. The number and locations of minutiae vary from finger to finger in any particular person, as well as from person to person for any particular finger. When a fingerprint image is obtained from a person, minutiae data can be recorded by determining the precise locations of the minutiae in the form of numerical coordinates and the precise direction of the minutiae in the form of numerical degrees of angle. The result is a fingerprint minutiae template with a fingerprint minutiae data structure.

The fingerprint template data comprises the recorded minutiae data having the predetermined minutiae data structure. The fingerprint minutiae template can be entered and stored, e.g. in a computer database. Thereby, any particular fingerprint minutiae template can be compared with that of anyone else in the world whose fingerprint minutiae template has been stored, as well, for fingerprint recognition.

The comparison may be done by means of a correspondingly programmed computer implementing a fingerprint comparator.

For the fingerprint recognition, currently several fingerprint comparators exist that exploit solely minutiae features. For example, there is the NIST Biometric Image Software (NBIS) distribution developed by the National Institute of Standards and Technology (NIST) for the Federal Bureau of Investigation (FBI) and Department of Homeland Security (DHS) in the United States of America. The NBIS utilities cover eight general categories, which inter alia comprise a fingerprint comparison algorithm called BOZORTH3 that is minutiae based fingerprint comparison algorithm that does both one-to-one and one-to-many comparison operations. A further example is the minutiae cylinder code (MCC) algorithm described, for example, by Raffaele Cappelli et al. in "Minutia Cylinder-Code: A New Representation and Matching Technique for Fingerprint Recognition," IEEE Transactions on Pattern Analysis and Machine Intelligence, volume 32, number 12, pages 2128-2141, December, 2010.

The advantage of the standard fingerprint minutiae templates based on a standard data format (ANSI or ISO versions, such as ISO/IEC 19794-2:2005, ISO/IEC 19794-2:2011, and ANSI INCITS 378-2004) is the compatibility achievable by vendors as long as conforming to the standards. However, the encoding process from a fingerprint image into a fingerprint minutiae template with a particular minutiae data structure format causes information loss and thus fingerprint recognition algorithms relying solely on minutiae data, such as the above mentioned BOZORTH3, are normally less performing compared to those algorithms exploiting extra information, such as e.g. ridge count, ridge density, ridge shape, etc., in addition to minutiae information. Thus, how to achieve a good performance with solely minutiae-based fingerprint comparators is a technical challenge since for many years. The MCC algorithm as a solely minutiae-based fingerprint comparison algorithm has already achieved an excellent performance according to test reports.

U.S. Pat. No. 5,631,971 A discloses a vector based topological fingerprint matching system. US 2004/0042645 A1 discloses a fingerprint recognition method, and fingerprint control method and system. Both U.S. Pat. No. 5,631,971 A and US 2004/0042645 A1 use ridges and other structural information in addition to minutiae data. Further, U.S. Pat. No. 6,766,040 B1 discloses a system and method for capturing, enrolling and verifying a fingerprint. US 2004/0042645 A1 shows in essence an approach using multiple sensors for accuracy improvement. ITBO 20090149 A1 with the title "Metodo di codifica delle minuzie di una impronta digitale e corrispondente metodo di riconoscimento di impronte digitali" (relating to the MCC algorithm) and also U.S. Pat. No. 6,766,040 B1 concern algorithms that rely solely on the minutiae information to achieve high recognition accuracy.

However, simple methods, such as minutiae pair comparisons, as used in the BOZORTH3 algorithm, suffer from low recognition accuracy. Further, the MCC algorithm, while having excellent recognition performance, lacks privacy protection for the generated templates.

SUMMARY

In view of the discussion above, it is an object to improve biometric systems that use fingerprint data such as fingerprint minutiae templates created from corresponding fingerprint samples so that a better recognition performance can be achieved, preferably whilst allowing even for comparison of protected fingerprint templates without significant degradation in recognition performance.

The object is attained with the features of the independent claims. Further embodiments and developments ensue from the dependent claims, the description, and the drawings.

The quintessence of the herein proposed improvement lies in several facets which at least together are a breakthrough for applications using fingerprints.

A first facet concerns a novel transformation F for a fingerprint minutiae data structure which transformation F is configured to generate a redundant and reliable (transformed) fingerprint template V from any fingerprint minutiae template MT, i.e., V=F(MT). The herein proposed transformation F can be applied to fingerprint minutiae template data records which are widely standardized, for example by ISO/IEC 19794-2:2005, ISO/IEC 19794-2:2011, and ANSI INCITS 378-2004, and adopted by different fingerprint recognition technology providers globally, and thus may achieve the best market compatibility. That is, the herein proposed technical improvement respects widely-adopted fingerprint minutia data standards.

A second facet concerns a fingerprint comparator C by which two transformed fingerprint templates $V_1$ and $V_2$ generated from two corresponding original fingerprint minutiae templates $MT_1$ and $MT_2$ can be compared directly. The fingerprint comparator C is configured to generate a comparison score S indicating the similarity of the two compared fingerprints, i.e., $S=C(V_1, V_2)=C(F(MT_1), F(MT_2))$. It is noted that from the perspective of the plain fingerprint minutiae templates $MT_1$ and $MT_2$, the combination of C and F can be regarded as a new fingerprint comparator C', i.e., $S=C'(MT_1, MT_2)$. Further, it is noted, herein the ISO standard compliant term "comparator" is used instead of "matcher" and "comparison" is used instead of "matching".

A third facet concerns a possible protection of the novel fingerprint templates $V_1$ and $V_2$, for instance, by means of a binding scheme for binding biometric data of an individual and a secret of the individual, denoted by Enc; a suitable biometrics-secret binding scheme is described in detail in parallel pending patent applications U.S. Ser. No. 15/062,352 and DE 10 2016 002 792.4 of the same inventors with the title "Privacy-Enhanced Biometrics-Secret Binding Scheme", the contents of which is herewith incorporated by reference. The application of the biometrics-secret binding scheme, for the here given example, results in protected fingerprint templates $PV_1=Enc(V_1)$ and $PV_2=Enc(V_2)$. It was found that two protected fingerprint templates $PV_1$ and $PV_2$ can be compared directly using the same fingerprint comparator C as in the second facet to generate a comparison score $S'=C(PV_1, PV_2)$ indicating the similarity of the two protected fingerprint templates $PV_1$ and $PV_2$.

A first facet of the invention provides a computing device for processing fingerprint minutiae template data. Accordingly, the computing device is configured for generating transformed fingerprint template data from original fingerprint minutiae template data, in which minutiae are represented at least by Cartesian or polar coordinates and an inherent minutiae direction. To this end, the computing device is configured to generate for each minutia of the original fingerprint minutiae template data corresponding mega-vicinity data.

In one embodiment, the computing device, for generating mega-vicinity data for a particular one minutia m, comprises: a first module that is configured to define for the minutia m in the original fingerprint minutiae template data the corresponding mega-vicinity as a, preferably disk-shaped, vicinity area, preferably with a predetermined radius TH in the Euclidean distance (or another distance metric) surrounding the minutia m as the center; a second module that is configured to align geometrically all other minutiae inside the defined mega-vicinity with respect to the minutia m, wherein the minutia m defines the origin of a Cartesian and polar, respectively, coordinate system x-m-y, wherein the direction of the minutia m of the original fingerprint minutiae template data defines the x-axis and the direction of the zero angle, respectively, of the Cartesian and polar, respectively, coordinate system; a third module that is configured to check for each other minutia in the original fingerprint minutiae template data, if its location is within the vicinity area; and a fourth module that is configured to form the mega-vicinity data for the minutia m as comprising first layer data comprising all minutiae located inside the vicinity area and second layer data comprising the respective N closest neighboring minutiae around each of the minutiae in the first layer data, wherein N is a predetermined number.

The number N may be selected by the user. A possible approach for selecting N is an empirical way, wherein the fact may be considered that a small N may not incorporate enough neighborhood information for reducing the false match rate while a large N may not achieve enough robustness resilient to inherent minutiae distortions for reducing the false non-match rate.

The shape of the vicinity area is preferably made disk shaped so that it can be defined by a circle with the radius TH and the minutia m as its center. However, also other shapes for the vicinity area may be possible, as well. Further, the predetermined radius TH is settable by the user and may be e.g. 200 pixels. The radius TH can be set in an empirical way considering both the recognition performance and the template data size. A larger TH may increase the computational complexity in time and space significantly as the mega vicinities are crossly compared while a small TH may not incorporate enough distinguishing information to achieve a good recognition performance.

If another minutia in the original fingerprint minutiae template data has a location within the disk area or not, may be checked e.g. by means of the Euclidean distance between the other minutia and the minutia m. The Euclidean distance may be calculated based on the coordinates of the minutia m and the respective other minutia from the original fingerprint minutiae template data.

For example, assumed there are M minutiae (except the origin minutia m) located inside the disk area of the corresponding mega-vicinity, the M minutiae are defined as layer L1 minutiae and around each of the M minutiae there are N layer L2 minutiae to be found; it is noted the minutia m is not counted as one of M.

For example, each mega-vicinity data with M minutiae comprises M (N+1) minutiae inside, i.e., for each of the M L1 minutia, there are N L2 minutiae associated.

For example, each minutia in the original fingerprint minutiae template data can be represented by polar coordinates (R, A, D), defining the distance of the respective minutia to the origin for the original fingerprint minutiae template, the direction from the origin for the original fingerprint minutiae template towards the respective minutia, and the inherent minutiae direction as defined for the corresponding type of minutia.

Alternatively, each minutia in the original fingerprint minutiae template data can be represented by polar coordinates (R, A, D), wherein R is the distance of the respective minutia to the origin for the original fingerprint minutiae template, A is the direction of the origin for the original fingerprint minutiae template towards the respective minutia, and D is the inherent minutiae direction defined for the corresponding type of minutia.

In a further development, the computing device may further comprise a fifth module, e.g. a quantitation module, that is configured to reduce the data size of the generated transformed fingerprint template data by quantizing the transformed minutia data to limited discrete bins.

For example, as mentioned above, each minutia can be represented by a coordinate triplet (R, A, D). Thus, the three real-values or floating point values R, A, and D can be quantized into respective three integers by either even or uneven scalar quantization so that the dynamic range [0, TH] for R and [0,359] for A and D is divided into $2^{I_1}$, $2^{I_2}$, and $2^{I_3}$ bins, where $I_1$, $I_2$, and $I_3$ are integers. The three quantized integers can be represented in a binary form with $I_1$, $I_2$, and $I_3$ bit lengths, respectively. Moreover, by adjusting the bit lengths to suitable small sizes, the minutiae data size of the minutiae triplet (R, A, D) can be fully controlled.

A second aspect of the invention provides a computing device for processing two transformed fingerprint template data. The computing device of the second aspect of the invention may be a further development of the computing device of the first aspect of the invention. Accordingly, the computing device may (further) comprise a fingerprint comparator module that is configured to compare the novel transformed fingerprint template data. The transformed fingerprint template data comprises, for each minutia, mega-vicinity data, obtainable by the computing device of the first aspect of the invention, of a first fingerprint (template) and a second fingerprint (template). The fingerprint comparator module can be configured to (i) determine minutiae match cases in the first layer L1 of two aligned mega-vicinities from the first transformed fingerprint template data and the second transformed fingerprint template data, (ii) to compare, for each match case in the first layer L1, a predetermined number N of closest neighboring minutiae of the second layer L2 around each of the two matched minutiae, wherein N>0, and (iii) to determine for each match case a comparison score.

It is noted that for determining each match case the comparison score is needed to be larger than a threshold predetermined for the measured distance in a particular distance metric. The comparison operation to be performed can be chosen arbitrarily by the skilled person and is open in options.

Further, a match can be determined by various methods, e.g., by measuring the Euclidean distance of two minutiae.

Furthermore, the comparison can be done by various methods, e.g. by measuring the distance between two minutiae using a particular distance metric.

Moreover, the proposed comparison of mega-vicinity data of two transformed fingerprint template data combines a global scale (first layer L1) and local scale (second layer L2) comparison strategy and thereby achieves a good trade off of between false match and false non-match of two mega-vicinities. Firstly, in a global step (i), all minutiae match cases in the two aligned mega-vicinities are identified by finding matches between minutiae in the first layer L1. The global step (i) aims at finding out as many genuine match cases as possible to reduce the False-Non-Match Rate (FNMR) to a very low level. Then, in a local step (ii), for each of the match cases in the first layer L1, the N closest neighboring minutiae in the second layer L2 around each of the two matched minutiae of the first layer L1 are compared to ensure the match case is a genuine match. The local step (ii) aims at filtering out falsely match cases to bring the False Match Rate (FMR) effectively to a low level.

In one embodiment, the fingerprint comparator module can be further configured to combine the comparison scores of the comparison in the first layer L1 and the comparison scores of the comparison in the second layer L2 into a fused score for the two mega-vicinities.

For example, the fingerprint comparator module can be configured to calculate a fused comparison score by a multiplication operation may be used to combine the comparison scores for the first layer L1 and second layer L2 into the fused score so that only those minutiae with both positive comparison scores for both layers L1, L2 can generate a non-zero fused score.

Alternatively, or additionally, the fingerprint comparator module can be further configured to weigh the fused comparison score by the sum of the distances from a matched minutia to its L neighbors, wherein L>0. It is noted L is a variable that can be determined empirically. As a result, the weighing of the fused comparison score by the sum of the distances from a matched minutia to its L neighbors results in generating a high weight when the distances are large and a low weight when the distances are low.

Alternatively, or additionally, the fingerprint comparator module can be further configured to generate a mega-vicinity comparison score for a mega-vicinity and to weigh the comparison score for a particular mega-vicinity by the ratio of the matched minutiae in the first layer L1 of the particular mega-vicinity and the total number of minutiae in the first layer.

For example, the mega-vicinity comparison score can be a result of combining different two-layer fused scores inside one mega-vicinity. For example, such a combination can be a summation operation. This results in generating a high weight when the ratio is high and a low weight otherwise.

Additionally, the fingerprint comparator module can be further configured to generate a normalized final comparison score between the two transformed templates by checking not only the highest comparison score between a probe mega-vicinity and a group of reference mega-vicinities, but also to check other non-highest comparison scores.

A general rule is that the final score can be high if the mean value and the standard deviation of the other scores are low.

In a particular embodiment, the computing device may further comprise a biometrics-secret binding module configured to encrypt plain mega-vicinity data into protected mega-vicinity data. The binding scheme for binding biometric data of an individual and a personal secret of the individual is disclosed in detail by the parallel pending patent applications U.S. Ser. No. 15/062,352 and DE 10 2016 002 792.4 of the same inventors with the title "Privacy-Enhanced Biometrics-Secret Binding Scheme", the contents of which is herewith incorporated by reference. This binding scheme can be used to protect the herein proposed transformed fingerprint template data for an enhanced privacy protection.

Accordingly, for protecting plain mega-vicinity data, the computing device comprises a quantization module and block cipher module which play the roles of the "robust feature extractor" and the "crypto-function", respectively, of the "biometrics-secret-binding scheme". The minutiae data R, A, D which are polar coordinates of the ISO format minutiae triplet (x, y, direction), together play the role of "feature $f_1$" of the "biometrics-secret-binding scheme". Thus, robustly quantized plain data R, A, and D are used as diversification data involved in the generation of respective keystreams $S_1$, $S_2$, and $S_3$ for encrypting the plain data R, A, and D themselves. As there is no order among minutiae in a fingerprint minutiae template, this sort of diversification data helps to avoid using the same keystream in the encryption of the minutiae, thus increasing the security of the encryption process.

For example, the computing device can be part of a control unit of one of the following devices from the group comprising: a secure login device to computer systems, user identification device at kiosks or automatic teller machines, biometric door locks, credit card terminals, identity authentication protocols and devices, weapon activation control devices, theft protection in any electronic apparatus.

For example, the computing device can be arranged by corresponding hardware for at least one of: capturing fingerprint images, processing fingerprint images, extracting features from fingerprint images, generating transformed fingerprint template data from original fingerprint minutiae template data, storing fingerprint template data for comparison, and comparing or indexing fingerprint template data.

Summarizing, the herein proposed fingerprint minutiae data structure transformation F provides a novel fingerprint minutiae data representation which comprises a two-layer mega-vicinity structure to represent a fingerprint minutiae template created from a fingerprint sample. The novel fingerprint minutiae data representation basically enables: (a) a two-layer feature extraction and the comparison of the fingerprint minutiae templates to achieve the best trade off of false matches and false non-matches; (b) various distance metrics based weighting schemes for comparison score generation; and (c) for template protection the novel fingerprint minutiae data representation can be protected, e.g. by the above mentioned biometrics-secret binding scheme, without significant loss in recognition performance, and even without a significant variance in recognition performance when different encryption keys are used, whilst the novel fingerprint minutiae data format is largely preserved, i.e. the same fingerprint minutiae data format is partially used for both plain fingerprint templates V and protected fingerprint templates PV. An interesting finding is that, after protection, the transformed fingerprint minutiae data representation performs as accurately in recognition as its plain version whilst adopting the same fingerprint comparator C.

As solely minutiae-based, the herein proposed novel fingerprint minutiae data representation demonstrates a high recognition accuracy performance in terms of error rates, for which the FVC (fingerprint verification competition) testing protocol was used and produced the results, as shown in following Table 1. In this case, the commercial fingerprint minutiae extractor VeriFinger 7.0 was used to generate the original fingerprint minutiae templates.

TABLE 1

|  | EER | FNMR@FMR = 0.1% | FNMR@FMR = 0.0% |
| --- | --- | --- | --- |
| FVC2002DB2_A | 0.0107 | 0.0168 | 0.0207 |
| FVC2006DB2_A | 0.0055 | 0.0076 | 0.0103 |

The experiments over the public databases FVC2002 and FVC2006 show the recognition accuracy in terms of error rates calculated from both S and S' are high enough to compete with the state-of-the-art fingerprint minutiae template comparators, for instance, the Minutiae Cylinder Code (MCC) algorithm. In almost all experiments, the recognition accuracy of both plain and the protected templates are quite close to each other and in some cases the protected ones are even higher in recognition accuracy performance than their plain counterparts.

Preferred Exemplary Embodiments

Other advantages, features, and details of the herein proposed technical innovation ensue from the following description in which exemplary embodiments are described in detail with reference to the drawings figures. The features mentioned in the claims and in the description can each be essential in and of themselves or can be essential in any combination with one another. In the same way, the features mentioned above and explained in greater detail here can each be used by themselves or be united in any combination with one another. Some parts or components that are functionally similar or identical have been provided with the same reference numerals. The terms "left," "right," "top," and "bottom" used in the description of the exemplary embodiment refer to the drawings in an orientation in which description of the figures can be normally read and the reference numerals can be normally read. The embodiment shown and described is understood to be non-exclusive. The purpose of the detailed description is to provide information to the person skilled in the art; for this reason, known switches, structures, and methods are not shown or explained in detail in the description in order not to complicate comprehension.

Figure 1:
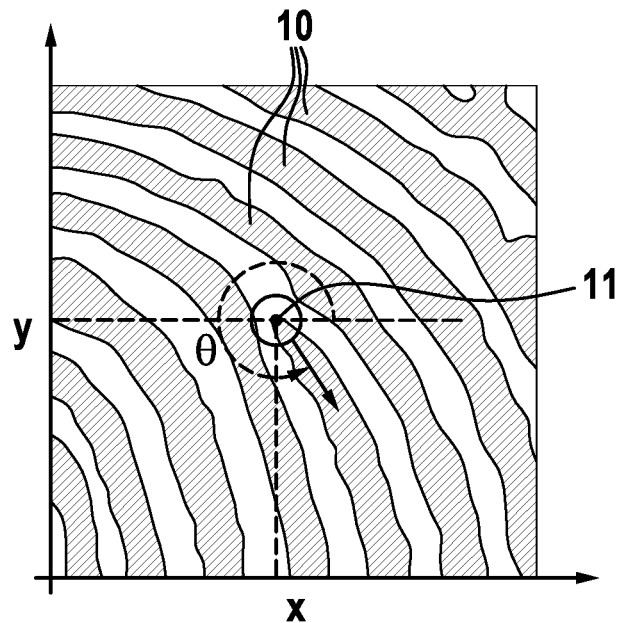
FIG. 1(a) illustrates, by way of example, the definition and representation of a first basic minutia type, namely fingerprint ridge endings.
FIG. 1(b) illustrates, by way of example, the definition and representation of a second basic minutia type, namely fingerprint ridge bifurcations.
Figure 1:
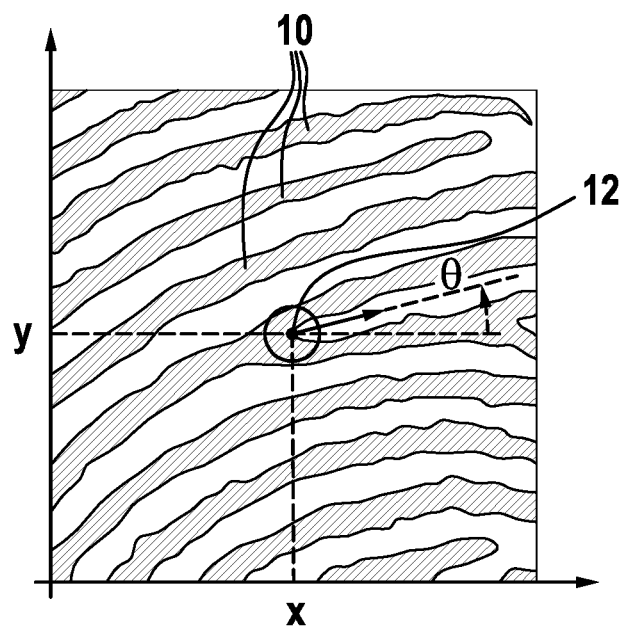

FIGS. 1(a) and 1(b) illustrate, by means of examples, the definition and representation of two basic minutia types. The first minutia type is a ridge ending 11, illustrated in FIG. 1(a), and the second minutia type is a ridge bifurcation 12, illustrated in FIG. 1(b); further possible minutia types (e.g. crossovers, islands, lakes, and spurs etc.) and details may be taken from e.g. IJCSI (International Journal of Computer Science Issues), Volume 8, Issue 5, Number 3, September 2011, ISSN (Online): 1694-0814. Accordingly, a minutia 11, 12 can be represented by the coordinates (x, y) of the minutia location in the corresponding fingerprint image with regard to a reference coordinate system and by the minutia direction $\Theta$ which can be defined as the direction of the underlying ridge 10 at the minutia location (x, y). Thus, fingerprint minutiae template data may comprise a standard format minutiae triplet (x, y, $\Theta$) for each minutia in the template. Accordingly, FIG. 1(a) illustrates the ridge ending minutia 11 in which (x, y) are the minutia's coordinates and $\Theta$ is the minutia's direction. FIG. 1(b) illustrates a ridge bifurcation minutia 12 in which (x, y) are the minutia's coordinates and $\Theta$ is the minutia's direction.

Thus, fingerprint minutiae template data usually comprises standard (according to ISO/IEC/ANSI and others) format minutiae triplets (x, y, $\Theta$) for each minutia in the template. From the standard format minutiae triplets (x, y, $\Theta$) polar coordinates R, A, D can be derived, wherein R is the distance of the respective minutia to the origin, A is the direction of the minutia calculated from the Cartesian to polar coordinate transformation, and D is the inherent minutiae direction, i.e. the direction of a ridge ending 11 or a ridge bifurcation 12. Note, all three attributes values are confined within a dynamic range. In the present invention, the origin used in the coordinate system transformation is the respective minutia in the original fingerprint minutiae template, wherein the inherent minutia direction defines the x-axis in the new coordinate system.

Now reference is made to FIGS. 2(a) to 2(c), by means of which the construction of a "mega-vicinity MV" will be explained, which forms the transformed representation of a respective minutia m of an original fingerprint minutiae template.

FIG. 2(a) shows a first fingerprint sample (image) 21 with detected minutiae 22 of the types shown in FIGS. 1(a) and 1(b), i.e. ridge ending minutiae 11 and ridge bifurcation minutiae 12. In FIG. 2(a) the detected minutiae 22 are marked by solid circular dots. The first fingerprint sample 21 is used here as an example of a reference fingerprint sample.

FIG. 2(b) shows a second fingerprint sample (image) 25 captured from the same finger as for the first fingerprint sample (image) 21 of FIG. 2(a), but the finger is captured in a different orientation and with a different fingerprint area with respect to the fingerprint scanner (not shown). In FIG. 2(b) the detected minutiae 26 are marked by solid triangles. FIG. 2(b) is used here as an example of a captured fingerprint sample, e.g. taken from a person, which is e.g. to be identified, by comparison of the fingerprint minutiae template data with reference fingerprint minutiae template data, such as the reference fingerprint sample of FIG. 2(a), which may be obtained from a database.

FIG. 2(c) illustrates the definition of a "mega-vicinity" which is used as a basic element of the herein proposed transformation to construe the transformed representation of a respective minutia m. It is noted that FIG. 2(c) shows the minutiae detected in both fingerprint sample images of FIGS. 2(a) and 2(b) just for illustration; for the transformation only the minutiae data of one particular fingerprint minutiae template is necessary.

The herein proposed novel fingerprint minutiae template data structure transformation F has been conceived to be generated from any standard fingerprint minutiae template MT, e.g. according to ISO/IEC 19794-2:2005, ISO/IEC 19794-2:2011, ANSI INCITS 378-2004a or the like, a redundant and reliable transformed minutiae template V, i.e. V=F(MT).

The herein proposed novel fingerprint minutiae template data structure transformation F can be implemented by means of a correspondingly configured algorithm which can be installed on and run by any suitable computing device, e.g. as in known fingerprint recognition devices used for fingerprint capture and/or analysis and/or comparison and/or storage as done already by the devices of the existing fingerprint recognition technology providers globally. In this context, the term "module" used herein express that a particular process can be implemented as a module providing a particular function. That is to say, any process discussed here can be implemented by software means such as a correspondingly configured software module. Alternatively, an implementation may be made by the use of correspondingly configured hardware such as correspondingly configured FPGAs (field programmable gate arrays) or any other suitable hard wired circuitry as a hardware module. Of course, any configuration in between these two ways of implementation, namely a full implementation by software and full implementation by hardware, is possible as well, i.e. a combination of particular parts implemented in software and other parts implemented in hardware. As the implementation provides basically no new aspects for the skilled person, a description thereof is omitted here. That is to say, the terms "process" and "module" are used here correspondingly. Note, a particular process itself may be decomposed into several processes on a lower level; correspondingly, a particular module providing a particular function may be composed of one or more (sub-)modules providing particular (sub-)functions.

Accordingly, a suitable programmable computing device (as the computing device 800 described together with FIG. 7) may be configured by software modules each carrying out a corresponding algorithm for generating particular steps of the novel transformed fingerprint template data representation from original fingerprint minutiae template data. Accordingly, respective modules perform the following steps:

Firstly, a control module of the computing device (e.g. 800 of FIG. 7) is configured, in a step (a), to generate corresponding mega-vicinity data from a particular minutia m of the original fingerprint minutiae data. Secondly, a step (b) the control module is configured to check, whether step (a) was already performed for all minutia m in the original fingerprint minutiae template data. If step (b) detects that there is at last one minutia m left, step (a) is repeated for the next minutia m. If step (b) detects that step (a) was performed for all minutia m in the original fingerprint minutiae template data, the transformation algorithm is completed. In other words, step (a) is to be repeated for each minutia m in the original fingerprint minutiae data. Alternatively, on a multiprocessor computing device having plural real or virtual processing units step (a) may be performed, under control of the control module, in parallel for some or all minutiae in the original fingerprint minutiae template data.

Now, step (a), generating from a particular minutia m (of the original fingerprint minutiae template data) mega-vicinity data, by means of a mega-vicinity data generation module is discussed in detail. The generating of mega-vicinity data for each particular one minutia m in the original fingerprint minutiae template data is performed by the following (sub-)modules S1 to S4 the operation of which are described with respect to one particular minutia m from the minutiae in the original fingerprint minutiae template data.

First, a first sub-module S1 is configured to define, for the one particular minutia m in the original fingerprint minutiae data, the corresponding mega-vicinity MV as a disk shaped vicinity area having a radius TH. The radius TH defines a circle surrounding the one particular minutia m as the center. The radius TH may be predefined, e.g. may be 200 pixels long, wherein a pixel is a picture point of the original fingerprint sample.

Second, a second sub-module S2 is configured to align, all other minutiae, inside the defined mega-vicinity MV, geometrically with respect to the particular minutia m. To this end, the minutia m defines the origin of a respective Cartesian and polar, respectively, coordinate system x-m-y, wherein the direction $\Theta$ of the particular minutia m defined in the original fingerprint minutiae template data (cf. FIGS. 1(a) and 1(b)) defines the x-axis and the direction of the zero angle, respectively, of the Cartesian and polar, respectively, coordinate system.

Third, a third sub-module S3 is configured to check, for each other minutia of the original fingerprint minutiae template data, if its respective location is within the disk shaped vicinity area of the mega-vicinity MV by a particular distance metric. The check is done, for instance, by calculating between the respective other minutia and the one particular minutia m the Euclidean distance based on the coordinates (x, y) of the one particular minutia m and the respective other minutia; if the calculated Euclidean distance is smaller or equal to the predefined radius TH the respective other minutia belongs to the mega-vicinity MV of the particular minutia m.

Forth, a fourth sub-module (S4) is configured to form the mega-vicinity data structure of the one particular minutia m by means of all minutiae which are located within the vicinity area representing the mega-vicinity MV.

Preferably, the mega-vicinity data comprise two layers, namely a first layer L1 that comprises all minutiae located inside the vicinity area, and a second layer L2 that comprises the N closest neighboring minutiae around each of the minutiae of the first layer L1. To this end, again a particular distance metric, e.g., the Euclidean distance based on the coordinates (x, y), is used to define the neighborhood, and the number of neighbors N is a variable that can be adjusted.

Consequently, each mega-vicinity data with a number M of minutiae comprises M(N+1) minutiae. For example, in FIG. 2(c), if we define M=5 and for each minutia in the mega-vicinity MV we define two neighbors in layer L2, i.e. N=2. Accordingly, the mega-vicinity data comprises M(N+1)=5(2+1)=15 minutiae. Following Table 2 shows as an example data structure of the mega-vicinity MV for the minutia m in FIG. 2(c) with the two layers L1 and L2 for the example shown in FIG. 2(c).

TABLE 2

| L1 | L2-1 | L2-2 |
|---|---|---|
| $c_1$ | $c_{1,1}$ (= m) | $c_{1,2}$ (= $c_{4,1}$) |
| $c_2$ | $c_{2,1}$ (= m) | $c_{2,2}$ |
| $c_3$ | $c_{3,1}$ | $c_{3,2}$ (= m) |
| $c_4$ | $c_{4,1}$ (= $c_{1,2}$) | $c_{4,2}$ (= $c_1$) |
| $c_5$ | $c_{5,1}$ | $c_{5,2}$ |

In Table 2, the first column labeled "L1" represents the first layer L1 that comprises the five minutiae located inside the disk area with the radius TH. That is to say, L1 comprises all minutiae in the disk area except the particular minutia m that defines the origin of the mega-vicinity MV. As said, in the example N is set to 2, i.e. the second layer L2 comprises for each minutia of the first layer L1 the corresponding two closest minutiae. The minutiae of the first layer L1 are indexed $c_{i1}$, wherein i1 is a counter for the minutiae in the first layer L1.

The second column labeled "L2-1" of Table 2 comprises the corresponding closest minutia for the corresponding minutia of the first layer L1, i.e. the minutia in the same row and in the first column. The third column labeled "L2-2" of Table 2 comprises the corresponding second closest minutia for the corresponding minutia of the first layer L1. The minutiae of the second layer L2 are indexed $c_{i1, i2}$, wherein i1 indicates the corresponding minutia of the first layer L1, and i2 indicates the closest (i2=1) and the next closest (i2=2) minutia. Finally, another minutia or other minutiae in brackets just indicates identity of these minutiae; this is also shown in FIG. 2(c).

Figure 3:
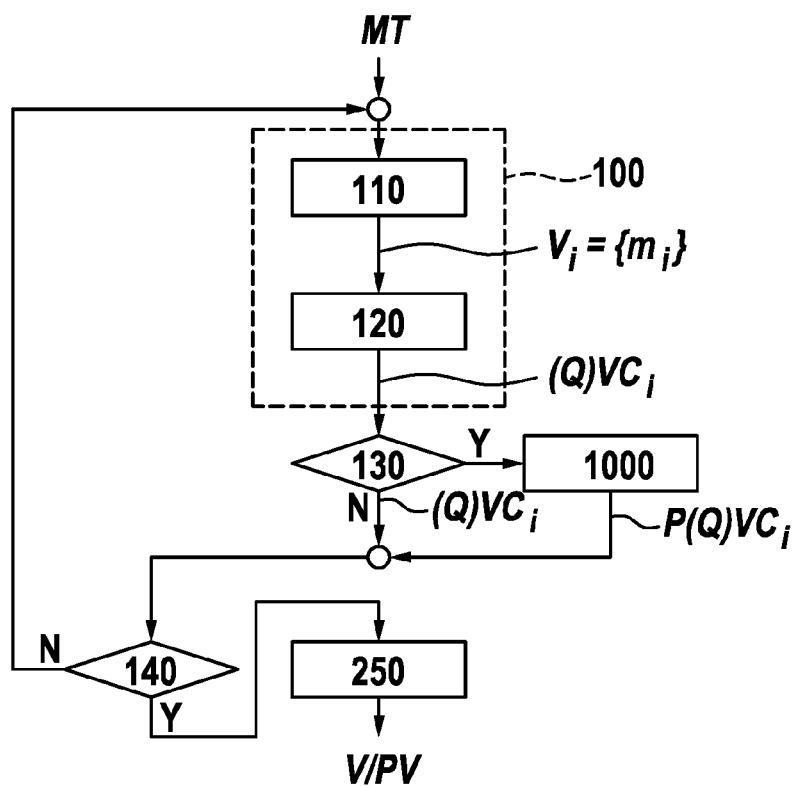
FIG. 3 illustrates an embodiment of the fingerprint minutiae template data generation by the transformation discussed with FIG. 2(c).

Now reference is made to FIG. 3 which illustrates, in a first top part, by way of a schematic flow diagram, the afore discussed generation of the novel transformed minutiae template data, i.e. the operation of the mega-vicinity data generation module 100.

In FIG. 3, original fingerprint minutia data of an original fingerprint minutia template MT=|$m_1, m_2, \ldots, m_M$| with minutiae $m_i$ is taken as input. The original fingerprint minutia template MT may be for example generated from an ISO fingerprint minutia template. The mega-vicinity data generation module 100 may be implemented in e.g. by the computing device (e.g. the device 800 of FIG. 7).

The mega-vicinity data generation module 100 comprises a mega-vicinity creation module 110 that is configured to produce for i=1, 2, ..., M, from the fingerprint minutia template MT the corresponding mega-vicinity data $MV_i$ for each minutia $m_i$ of the input minutiae template data MT by performing the transformation discussed in connection with FIG. 2(c) above. That is to say, the transformation is performed in a loop for i=1, 2, ..., M as illustrated by the loop counter 140 in FIG. 3. Alternatively, the transformation may be performed for all or in part minutia $m_i$ of the input minutiae template data MT in parallel, if the computing device is configured accordingly or is a multi-processor system.

As discussed above, the mega-vicinity creation module 110 is configured to generate the mega-vicinity data $MV_i$ for each particular minutia $m_i$. The mega-vicinity data $MV_i$ comprises all minutiae, which are located in the respective mega-vicinity area defined by the radius TH·That is to say, the mega-vicinity creation module 110 identifies all minutiae belonging to the respective mega-vicinity $MV_i$ by means of the above discussed transformation. Accordingly, the L1 minutiae of the respective mega-vicinity $MV_i$ are those minutiae the distance of which is smaller or equal the radius TH defining the vicinity area of the corresponding mega-vicinity $MV_i$ of the minutia defining the center of the disk shaped vicinity area, i.e. the distance of which to the origin defined by the corresponding minutia $m_i$ of the particular mega-vicinity data $MV_i$ is smaller than the radius TH, i.e. $d(m_i, m_j) \leq TH$, $j \neq i$, $j=1, 2, \ldots, M$.

Additionally, or optionally, the mega-vicinity data generation module 100 comprises an optional quantization module 120 that is configured to quantize the respective mega-vicinity data $MV_i$ for the corresponding minutia $m_i$. Thereby, the minutiae template data size can be reduced. Accordingly, the quantization module 120 takes as input the mega-vicinity data $MV_i$ output from the mega-vicinity creation module 110. The quantization module 120 is configured to produce as output corresponding quantized mega-vicinity code $QVC_i$ that can be compared directly.

The method of quantization performed by the quantization module 120 can, for example, include a scalar quantization algorithm or a vector quantization algorithm, wherein a scalar quantization algorithm outputs a set of quantization bins' indices and vector quantization algorithm outputs one index.

Accordingly, the quantization module 120 provides for reducing the minutiae template data size by means of quantization. Reducing the minutiae template data size, which is achieved by quantizing the minutia triplets (R, A, D), also results in a limitation of discrete bins in the fingerprint minutiae template representation. To this end, the quantization module 120 can, for example, be configured to quantize the three real-values R, A, D into three integer indices by scalar quantization, whose quantizing levels may be either even or uneven and divide the dynamic range [0, TH] for R and [0, 360) in angle (or [0, $2\pi$) in radian) for A and D into $2^{I_1}$, $2^{I_2}$, $\Delta 2^{I_3}$ bins, where $I_1$, $I_2$, and $I_3$ are integers. The three quantized integers for R, A, and D can be represented in a binary form with $I_1$, $I_2$, and $I_3$ bit lengths, respectively. By adjusting the bit lengths to suitable small sizes, the data size of a corresponding minutiae triplet (R, A, D) can be fully controlled.

Now with respect to the bottom part of FIG. 3, as noted before, the novel fingerprint templates comprising the novel (quantized) mega-vicinity code $(Q)VC_i$ may optionally be protected. This is indicated by a setting selection module 130 in the flow diagram.

Finally, the (quantized) mega-vicinity code $(Q)VC_i$ or a protected version $P(Q)VC_i$ is assembled by an assembly module 250 which outputs a plain, i.e. not protected, transformed fingerprint template V comprising the (quantized) mega-vicinity code $(Q)VC_i$ or outputs a protected template PV comprising the protected (quantized) mega-vicinity code $P(Q)VC_i$.

For instance, at the output of the mega-vicinity data generation module 100, is the setting selection module 130 by which it can be set whether the (quantized) mega-vicinity code $(Q)VC_i$ generated by the mega-vicinity data generation module 100 is to be protected or not.

If no protection shall be used, the generated mega-vicinity code $(Q)VC_i$ is directly forwarded to the assembly module 250 to be assembled into the plain, i.e. not protected, transformed fingerprint template V.

If protection shall be used, the generated mega-vicinity code $(Q)VC_i$ is forwarded to a protection module 200 for protection of the generated mega-vicinity code $(Q)VC_i$ into the protected (quantized) mega-vicinity code $P(Q)VC_i$. After protection, the protected (quantized) mega-vicinity code $P(Q)VC_i$ is forwarded to assembly module 250 to be assembled into the protected transformed fingerprint template PV.

In a particular embodiment, the protection module 200 is configured to protect the generated mega-vicinity code $(Q)VC_i$ by application of the already mentioned biometrics-secret-binding scheme. A possible implementation is described in connection with FIGS. 5 and 6 herein below. Advantageously, the protected fingerprint templates PV can be compared directly without significant loss in performance compared to the plain templates V.

Figure 4:
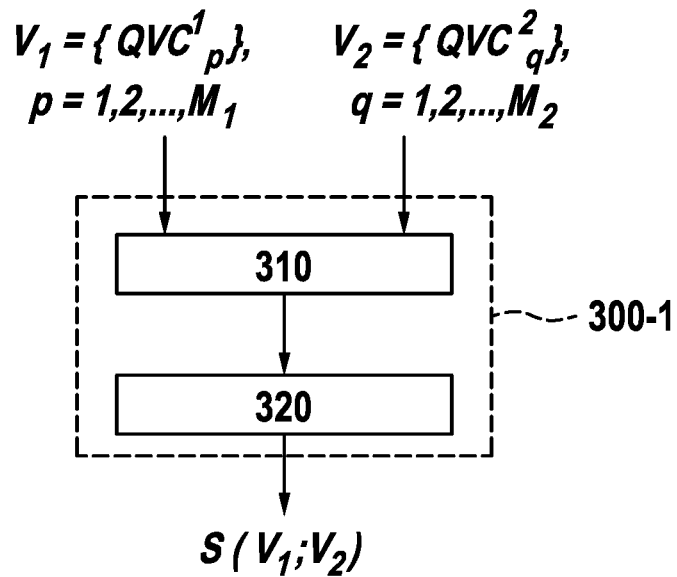
FIG. 4(a) illustrates an embodiment of a plain transformed fingerprint template comparator.
FIG. 4(b) illustrates an embodiment of a protected transformed fingerprint template comparator.
Figure 4:
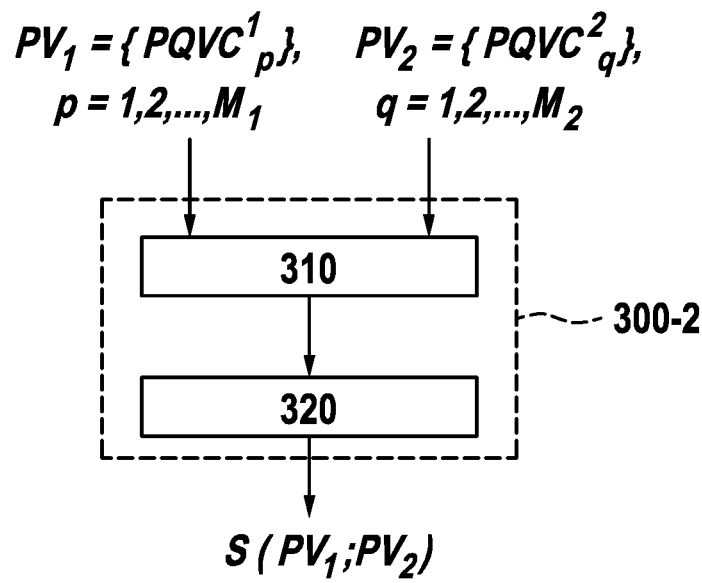

Now reference is made to FIGS. 4(*a*) and 4(*b*), which illustrate fingerprint minutiae template comparison by a comparison module 300-1 for plain transformed fingerprint templates V (FIG. 4(*a*)) or comparison module 300-2 for protected transformed fingerprint templates PV (FIG. 4(*b*)). Since both comparison modules 300-1 and 300-2 are in general similarly construed, the function of both will be explained simultaneously.

Assuming two transformed (protected) templates $(P)V_1$ and $(P)V_2$ comprising $M_1$ and $M_2$ mega-vicinity codes $(P)QVC^1_p$ (p=1, 2, ..., $M_1$) and $(P)QVC^1_q$ (q=1, 2, ..., $M_2$), respectively, the $M_1$ and $M_2$ mega-vicinity codes are crossly matched by means of a correspondingly configured mega-vicinity cross comparison module 310 which is configured to generate $M_1 \times M_2$ mega-vicinity comparison scores S, which are to be fused by means of a score fusion module 320 which is configured to generate the final comparison score of the two (protected) templates $(P)V_1$ and $(P)V_2$.

Accordingly, the computing device (e.g. the device 800 of FIG. 7) for processing fingerprint template data can be configured for comparison of fingerprint minutiae template data by implementing at least one of the afore-described comparison modules 300-1, 300-2. The fingerprint minutiae template data comprises for each minutia mega-vicinity data which can be obtained by means of the transformation discussed in connection with FIGS. 2(*c*) and 3. Thus, by means of the comparison module 300-1 or 300-2, which can be implemented by the computing device (e.g. 800 of FIG. 7), first fingerprint minutiae template data of a first fingerprint (e.g. the one of FIG. 2(*a*)) and second minutiae fingerprint data of a second fingerprint (e.g. the one of FIG. 2(*b*)) can be compared to find whether both fingerprints are identical or not. In this connection, it is noted that in FIG. 2(*c*) actually a comparison situation for the first and second fingerprint of FIGS. 2(*a*) and 2(*b*) is illustrated for one particular mega vicinity MV.

To this end, the respective comparison module 300-1 or 300-2 is configured to (i) determine for possible minutiae match cases in the first layer L1 of two aligned mega-vicinities from the first and the second fingerprint template data. Aligned means that each of the two mega-vicinities to be compared are aligned with respect to the inherent direction of the respective minutia that defines the center of the respective mega-vicinity MV as by way of example illustrated in FIG. 2(*c*).

For the comparison of two mega-vicinity data of two fingerprint template data, the mega-vicinity cross comparison module 310 is configured to perform a comparison with a global scale by comparing the minutiae in the respective first layer L1 and a comparison with a local scale by comparing corresponding neighbor minutiae in the second layer L2. This comparison strategy achieves the best trade off of false match and false non-match of two mega-vicinities.

Firstly, for the global comparison, the mega-vicinity cross comparison module 310 is configured to identify minutiae match cases in the two aligned mega-vicinities in the first layer L1 of the two fingerprint template data and to produce a corresponding first comparison score between the two L1 minutiae compared. This comparison score can be generated by measuring the distance between the two sets of minutiae triplet (R, A, D) pertaining to the two L1 minutiae compared. The distance metric can be, for example, the Euclidean one. By finding out as many genuine match cases as possible, the False-Non-Match Rate (FNMR) can be reduced to a level as low as possible.

Secondly, for the local comparison, the mega-vicinity cross comparison module 310 is configured to compare for each match case of the global comparison (L1 comparison), also the N closest neighboring minutiae in the second layer L2 around the two matched minutiae of the first layer L1 and to produce a corresponding second comparison score. To compare the two sets of N closest neighboring minutiae, a 3N-dimensional vector can be constructed from the minutiae triplets (R, A, D) of each set of N neighboring minutiae and then the two 3N-dimensional vectors can be measured by a particular distance metric, for example, the Euclidean one. In practice, to compensate the variance in the vector formation caused by minutiae missing, spurious minutiae, and neighboring order error, various combination of the N closest neighboring minutiae can be used to form a 3N-dimensional vector. For instance, assuming N=3, and $m_1$, $m_2$, $m_3$, and $m_4$ represent the closest 4 neighboring minutiae correspondingly, this 3×3=9 dimensional vector can be formed by following concatenation examples: $m_1|m_2|m_3$, $m_2|m_1|m_3$, $m_1|m_3|m_2$, $m_1|m_3|m_4$, etc. Some or all of these combinations can be stored in the database as a reference for comparison. The local comparison ensures that a match case resulting from the global comparison is a genuine match. The local comparison aims at filtering out false match cases so that the False Match Rate (FMR) is effectively controlled to a low level.

As discussed above, the mega-vicinity cross comparison module 310 is configured to combine for each match the first and second comparison scores of the comparison in the first layer L1 and the comparison in the second layer L2 into a fused score for the two compared mega-vicinities. Different methods can be used to achieve the purpose of the score combination.

For example, in one embodiment of the mega-vicinity cross comparison module 310, the combining is implemented by a multiplication operation. This provides the advantage that only those minutiae with positive first and second comparison scores for both layers L1, L2 can generate a non-zero fused score of the two layers L1, L2.

In still a further development, mega-vicinity cross comparison module 310 is alternatively or additionally configured to weigh a comparison score from first layer L1 by the sum of the distances from the matched minutia (either in the probe fingerprint minutiae template or in the reference fingerprint minutiae template) to its N neighbors in the first layer L1. This results in generating a high weight when the distances are large and a low weight when the distances are low. The same strategy is applied to the second layer L2 where the distances among the N neighbors in the second layer L2 are checked.

A final mega-vicinity comparison score is generated between two mega vicinities by combining all the two-layer fused scores discussed above from the matched minutiae inside the two mega vicinities. The combination is implemented by means of the score fusion module 320 which can use various methods such as simply a summation operation.

Additionally, or alternatively, the score fusion module 320 can be configured to weigh the mega-vicinity comparison scores by the ratio of the matched minutiae in the first layer L1. This results in generating a high weight when the ratio is high and to a low weight otherwise.

Additionally, or alternatively, the score fusion module 320 can be configured to generate a normalized final comparison score between two transformed templates by checking not only the highest comparison score between a particular mega-vicinity of the first fingerprint template data and a group of reference mega-vicinities of the second fingerprint template data, but also to check the distribution of other non-highest comparison scores. This results in generating a high final score particularly if the mean value and the standard deviation of the other scores are low.

Figure 5:
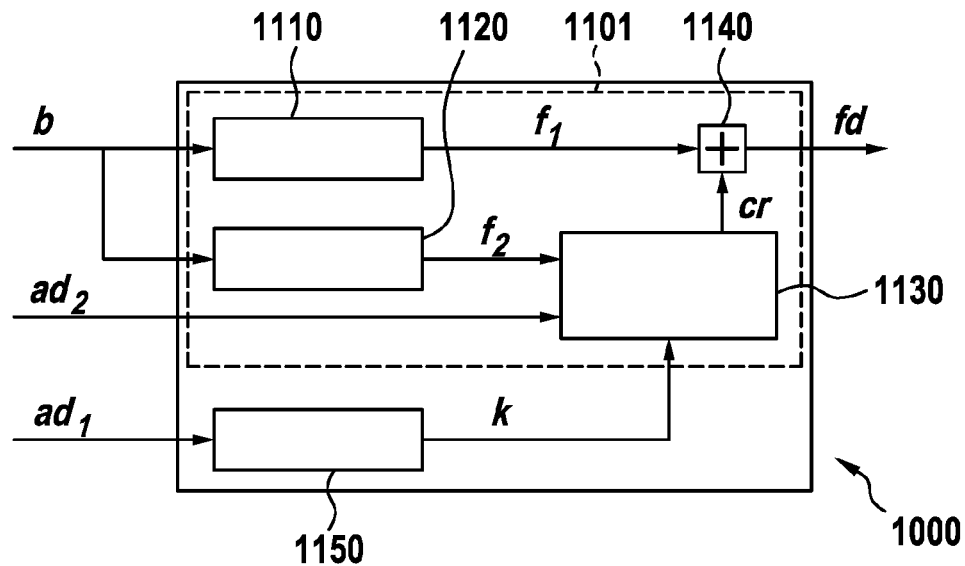
FIG. 5 shows a block diagram of an embodiment of a binding module that is configured to implement a biometrics-secret-binding scheme for binding biometric data of an individual and a secret of the individual.

Now with reference to FIG. 5 that shows a block diagram of a binding module 1000 that is configured to implement a binding scheme for binding biometric data of an individual and a personal secret of the individual as proposed in parallel pending patent applications U.S. Ser. No. 15/062,352 and DE 10 2016 002 792.4 of the same inventors with the title "Privacy-Enhanced Biometrics-Secret Binding Scheme. The binding scheme can be used to protect the herein proposed transformed fingerprint template data with regard to privacy protection.

The binding module 1000 comprises two parts, namely a binding operation module 1101 and a cryptographic hash function module 1150.

The binding operation module 1101 is the core part of the binding scheme, consisting of a distinguishing feature extractor module 1110, a robust feature extractor module 1120, a cryptographic function (crypto-function) module 1130, and a modulo-P addition operation module 1140 (denoted in FIG. 5 by a square with a plus sign inside). When P equals 2, the modulo-P addition operation module 1140 becomes an exclusive-OR operation module, which may be abbreviated as XOR-operation module.

The modules 1110, 1120 can implement any process preforming any feature extraction method that outputs distinguishing feature vectors $f_1$ (i.e. comprising information that can be used to differentiate biometric subjects, i.e. individuals) and robust feature vectors $f_2$ (i.e. comprising information that can be used to generate stable cryptographic parameters), respectively.

A distinguishing feature vector $f_1$, among other examples, can comprise those biometric features popularly adopted in existing biometric systems, for instance, minutiae features from a fingerprint, eigenvalues in principal component analysis (PCA) of a facial sample, binary iris code from iris patterns, etc. just to name a few. It is noted, the distinguishing feature vector $f_1$ can comprise particularly any new type of features to be developed in the future that can approximately uniquely characterize a biometric subject (individual) for recognition purpose.

A robust feature vector $f_2$, among other examples, can comprise those biometric features with lower distinguishability for accurately recognizing biometric subjects (individual) compared to those distinguishing biometric features described above but have a higher resilience to the inherent noise in biometric samples. Such inherent noises in biometric samples can be, among other possibilities, for example distortion in feature representation caused by rotation, translation, and scaling in fingerprint and facial samples, pose and lighting condition variance in facial samples, eyelash occlusion in iris pattern, etc. Herein, the robust feature vector $f_2$ extracted from the biometric feature b should be robust enough to tolerate the distortion between the biometric feature b extracted from different samples of the same biometric characteristic. For instance, an arbitrary minutia extracted from different fingerprint samples captured from the same finger can be different in its attributes' values (x, y, orientation, type, etc.) but a robust feature vector $f_2$ extracted from these distorted minutia features should be the same so that the feature is comparable as the output of the crypto-function module 1130. This is because any input with even 1-bit distortion to the used crypto-function shall lead to a completely scrambled output from the crypto-function due to the error sensitivity of employed cryptographic operations. That is to say, a robust feature vector $f_2$ is a vector that is always the same when extracted from different samples of a particular biometric feature b, i.e. the robust feature vector $f_2$ is independent from differences in attributes' values of the biometric feature.

The crypto-function module 1130 can implement any cryptographic function, e.g., cryptographic hash function such as one according to the SHA-n series algorithm or a block cipher such as one according to the AES or 3DES algorithm, with the purpose to generate scrambled padding values for the distinguishing feature vector $f_1$ via the modulo-P addition operation in the modulo-P addition operation module 140.

The crypto-function module 1130 takes as first auxiliary data $ad_1$ as a secret key k after a randomization process provided by means of a cryptographic hash function module 1150. Such a secret key k can be, e.g., a key for a cryptographic hash function or an encryption key for a block cipher.

The crypto-function module 1130 takes as plain input two data: public data as second auxiliary data $ad_2$, for example a cryptographic algorithm parameter such as nonce data or an ID number for a biometric subject (individual), characteristic, or an application, and the robust feature vector $f_2$. In order to make the modulo-P addition operation by module 1140 secure, the second auxiliary data $ad_2$ should be different for different biometric feature b captures, different characteristics, different individuals, and different applications. This can be achieved by suitable methods such as assigning different random values as the second auxiliary data $ad_2$ for different features, samples, characteristics, subjects, and applications if the biometric features b are ordered in data format. Otherwise, for unordered biometric features b, the same second auxiliary data $ad_2$ may be used for all the features. For example, the minutia feature is a type of unordered biometric feature and it is impossible to assign unique second auxiliary data $ad_2$ to an individual minutia in a set of minutiae because there is no order or other meta-data to distinguish one minutia from another.

Incorporating the robust feature vector $f_2$, in addition to the second auxiliary data $ad_2$, as the input to the crypto-function module 1130 has the following two reasons:

Firstly, the robust feature vector $f_2$, which is derived from the biometric feature b, can augment the second auxiliary data $ad_2$ to make the data to be processed by the crypto-function module 1130 adaptive to the biometric feature b to some degree. This implies that two distinctly-differed biometric features b may generate two different robust feature vectors $f_2$. In this sense, the robust feature vector $f_2$ can be used as a self-constructed order to differentiate the biometric features b, especially those inherently-unordered ones which are unable to differentiate. For these unordered biometric features, the robust feature vector $f_2$ is the only factor to make the output of the crypto-function module 1130 dynamically reflecting the difference in the biometric feature b. Thus, the robust feature vector $f_2$ enhances the security, when varied instead of the same output of the crypto-function module 1130 are used to protect, via the modulo-P addition based padding operation, the distinguishing feature vector $f_1$, when multiple robust features vectors $f_1$ are unordered.

Secondly, the robust feature vector $f_2$ modulates the information about the biometric feature b into the output of the crypto-function module 1130 and accordingly into the final fused data fd. Compared to a case using solely second auxiliary data $ad_2$ as the plain input, the output of the crypto-function module 1130 is secured by both the first auxiliary data $ad_1$, which is a secret and thus unknown to an adversary, and the biometric feature b itself, which is unknown to an adversary, as well. This fact ensures that a compromise to an adversary of either the first auxiliary data $ad_1$ or the biometric feature b will not cause an immediate breach of the distinguishing feature vector $f_1$. For instance, if the first auxiliary data $ad_1$, which is a secret, is compromised, an adversary still needs to perform a guessing brute-force attack to find the biometric feature b. Such brute-force attack would have a complexity roughly equivalent to $2^{n-1}$ where n is the entropy of the biometric feature b in bits.

To which degree the distinguishing feature vector $f_1$ and the robust feature vector $f_2$ are distinguishing and robust depends on varied considerations. Distinguishing feature vectors $f_1$ and robust feature vectors $f_2$ with too high entropies may make the fused data fd sensitive to biometric inherent noise and increase the biometric system's false non-match rate; while distinguishing feature vectors $f_1$ and robust feature vectors $f_2$ with too low entropies may make the fused data over-tolerant to differences in the biometric feature b and increase the biometric system's false match rate. From the security and privacy perspective, distinguishing feature vectors $f_1$ and robust feature vectors $f_2$ with high entropies will be hard enough against a guessing brute-force attack on the biometric feature b and thus also well protect the secret first auxiliary data $ad_1$. However, once compromised, e.g., via breached first auxiliary data $ad_1$, the high entropy of the feature vectors $f_1$ and $f_2$ will facilitate an adversary to reconstruct the biometric feature b. On the other hand, low entropy of the distinguishing feature vectors $f_1$ and the robust feature vectors $f_2$ will facilitate a brute-force attack targeting at the biometric feature b and thus also be bad for protecting the secret first auxiliary data $ad_1$. However, once compromised, e.g., via breached first auxiliary data $ad_1$, the low entropy of $f_1$ and $f_2$ will hinder an adversary to accurately reconstruct the biometric feature b.

The fused data fd generated from the invention can be used directly as a protected, in the sense of secure, or privacy-enhanced, or privacy-preserved, biometric template that can be compared to another protected template resulting in a comparison score indicating the similarity of the two biometric features b corresponding to the two protected templates fd.

Note, a secret that needs to be bound with the biometric data b is denoted as $S_m$. All other application-specific secret parameters used are denoted as k.

Figure 6:
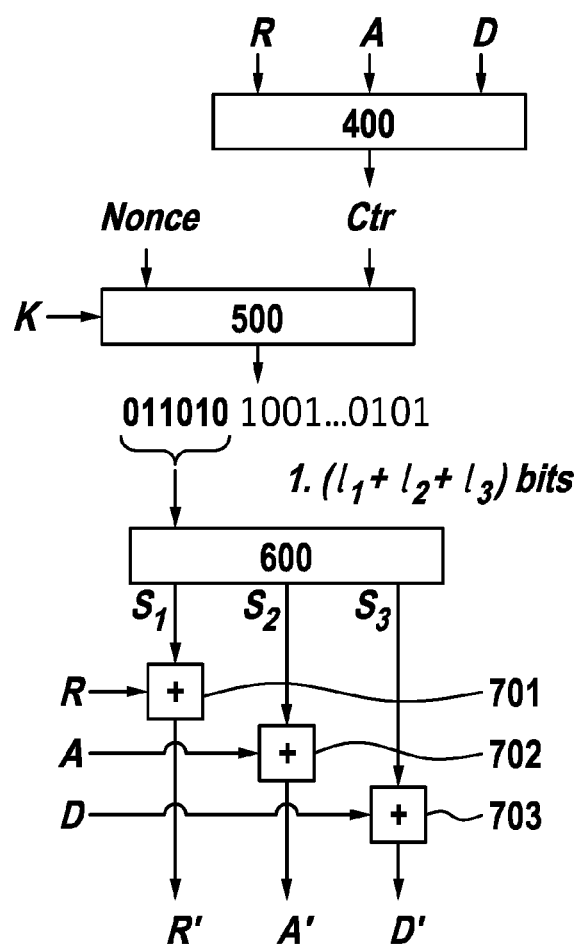
FIG. 6 illustrates an embodiment for the use of the biometrics-secret-binding scheme of FIG. 5 on minutiae triplets of mega-vicinity data of the herein proposed novel fingerprint minutiae representation.

Now reference is made to FIG. 6, which illustrates the application of the biometrics-secret-binding scheme on fingerprint minutiae data of the herein proposed novel transformed fingerprint template data. As mentioned before, the biometrics-secret binding scheme is described in detail in the parallel pending patent applications U.S. Ser. No. 15/062,352 and DE 10 2016 002 792.4 with the title "Privacy-Enhanced Biometrics-Secret Binding Scheme".

For the application of the biometrics-secret binding scheme discussed in connection with FIG. 5, the computing device comprises further a scalar quantization module 400.

Further, for all geometrically-aligned plain (unprotected) minutiae inside a particular mega-vicinity the same encryption is performed by a block cipher module 500, which is configured to perform a standardized encryption algorithm such as e.g., AES-128.

The block cipher module 500 has as input Ctr that is a 'counter' information, Nonce that is a constant value, and K that is a secret key to the adopted block cipher. K is a secret key to the adopted block cipher, which could be managed by the user and varied for different users (two-factor authentication scenario) or managed by the system (unique to the claimed identity) (single-factor authentication scenario).

Ctr is a 'counter' information to diversify the key stream ($S_1$, $S_2$, $S_3$) obtained from the same Nonce input but prepared for protecting different minutiae in a mega-vicinity. Ctr is obtained by coarsely (thus robust) quantizing the R, A, D into a binary vector. This diversification may be not enough in security depth by itself, especially in the case the encryption key K is leaked, but may provide enough diversification for all the minutiae in a template.

R, A, D are polar coordinates of the ISO format minutiae triplet (x, y, direction), wherein R is the distance of the minutiae to the origin, A is the direction of the minutiae calculated from the Cartesian to polar coordinate transformation, and D is the inherent minutiae direction (ending or bifurcation direction). Note, all three attributes values are confined within a dynamic range. Depending on applications with different data size requirements, R, A, D can be quantized results of the plain polar coordinates as well.

Nonce is a constant value same for all minutiae vicinities in a sample. Nonce is different for different fingers (finger/subject-specific) and their generated protected templates. Nonce should be different among different samples captured from the same finger for different applications, in order to avoid the linkability cross applications. Nonce is a public datum.

$l_1, l_2, l_3$ are the bit lengths that R, A, and D can be represented in a binary form. It is noted that in FIG. 6 "1. ( $l_1+l_2+l_3$) bits" means "the first ($l_1+l_2+l_3$) bits".

The "+" in the square represents modulo addition operation with $2^{l_1}$, $2^{l_2}$, and $2^{l_3}$ as the modulo integers (dynamic range) for R, A, and D, respectively.

The operation of the flow diagram of FIG. 6 will now be described in more detail. In brief, the quantization module 400 and block cipher module 500 play as the roles of "robust feature extractor" and "crypto-function" respectively in the parallel patent applications U.S. Ser. No. 15/062,352 and DE 10 2016 002 792.4 with the title "Privacy-Enhanced Biometrics-Secret Binding Scheme".

The correspondences between the parameters and variables in FIGS. 5 and 6 are as follows: The coordinates R, A, and D together play the role of "feature $f_1$". The original minutiae data from which the R, A, and D are derived play the role of "the biometric feature b". The parameter Ctr plays the role of the robust "feature $f_2$". The parameter Nonce data plays the role of auxiliary data $ad_2$. The secret key K plays the role of the cryptographic key k which is derived from the auxiliary data $ad_1$. Here the auxiliary data $ad_1$ can be a secret data managed by the user such as a PIN, password, etc., or a user-specific secret data managed by an access control system. The encryption result R', A', and D' together plays the role of the fused data fd.

The essence of this flow diagram is using the robustly quantized result of the plain data R, A, and D as diversification data involved in the generation of the keystream $S_1$, $S_2$, and $S_3$ to encrypt the plain data R, A, and D themselves. As there is no order among minutiae in a minutiae template, this sort of diversification data helps avoid using the same keystream to encrypt the minutiae, thus increasing the security of the encryption process.

Figure 7:
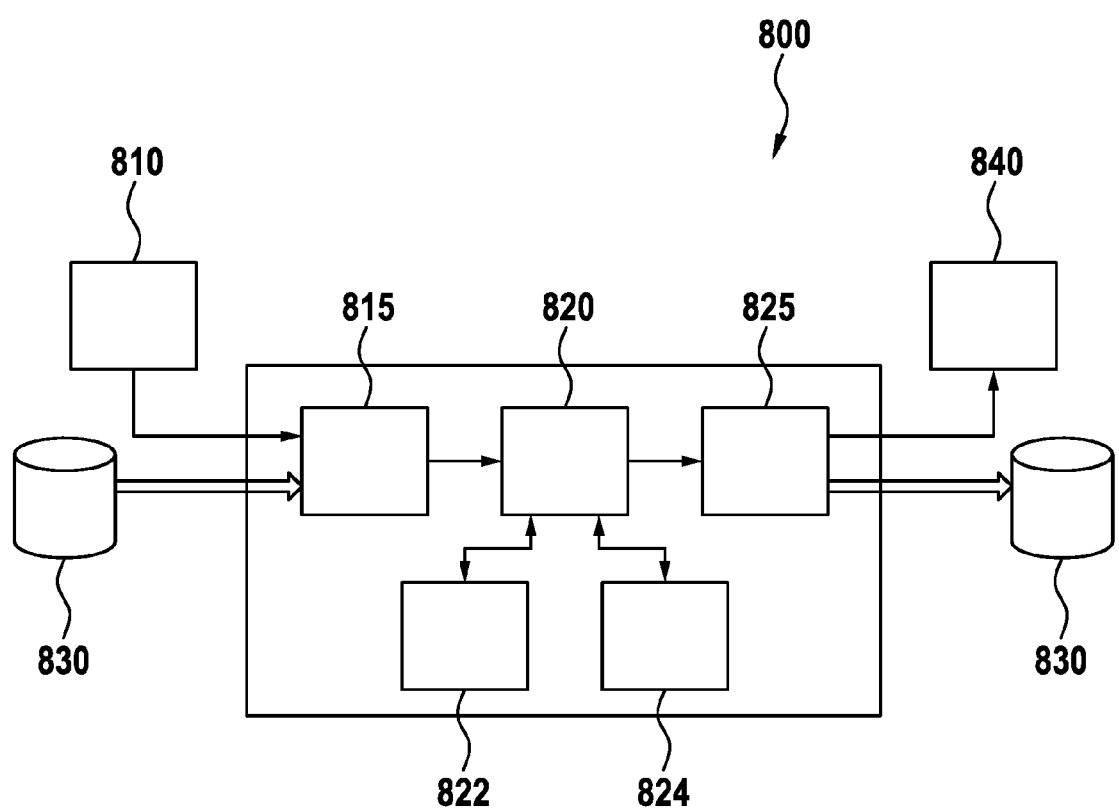
FIG. 7 shows an exemplary block diagram of an embodiment of computing device for data processing which computing device is configured for the functionalities described in connection with FIGS. 2A to 6.

Now reference is made to FIG. 7 showing by means of a block diagram a computing device 800 for data processing that can be configured for implementing the functionalities that have been described above in connection with FIGS. 2A to 6. In the following the computing device 800 will be only schematically described very briefly as in principle the structure of the computing device 800 and it necessary components are well known to the skilled person.

Basically, the computing device 800 comprises at least one digital processing unit 820 having at least one central processing unit (CPU). The apparatus 800 further comprises a working memory 822 interconnected with the digital processing unit 820 via an applicable data connection such as a data and control bus. The working memory 822 may be any kind of digital memory such as random access memory (RAM) for storing data to be processed as well as for storing processing results produced by the digital processing unit 820. The computing device 800 further comprises a permanent memory 824 such as a read only memory (ROM) for storing program code with computer program instructions. The permanent memory 824, similarly as the working memory 822, is interconnected with the digital processing unit 820 via an applicable data connection such as a data and control bus, as well.

The computing device 800 further has at least one input interface 815, interconnected with the digital processing unit 820 and configured for receiving data to be processed. Correspondingly, the apparatus 800 further has at least one output interface 825 that is interconnected with the digital processing unit 820 and configured outputting processing results.

For capturing fingerprint images, the computing device 800 comprises or is connected to a fingerprint capturing device 810 such as a fingerprint scanner which is able to capture a fingerprint of a finger or a complete handprint with all finger of a hand. The scanner is configured for capturing the sample image in a line by line approach or at once by means of optical, capacitive, inductive sensors or any combination thereof. The fingerprint capturing device 810 is interconnected with the at least one input interface 815.

The computing device 800 is arranged by its corresponding hardware for at least one of the following functionalities: capturing fingerprint images, processing fingerprint images, extracting features (such as minutiae) from fingerprint images, generating transformed fingerprint template data from original fingerprint minutiae template data, storing fingerprint template data for comparison, and comparing or indexing fingerprint template data.

Program code, which may be stored in the permanent memory 824 inter alia may comprise one or more computer programs which when executed by the digital processing unit 820 cause the processing unit 820 to implement one or more of the functionalities or modules discussed in connection with FIGS. 2(*c*) to 6.

For example, the processing unit 820 is configured for generating the transformed fingerprint template data from original fingerprint minutiae template data, in which minutiae are represented at least by Cartesian or polar coordinates and an inherent minutiae direction. Particularly, the computing device 800 is configured to generate for each minutia of such original fingerprint minutiae template data corresponding mega-vicinity data as proposed and discussed herein.

For permanently storing transformed fingerprint template data and for receiving fingerprint template data, the input interface 815 for receiving data to be processed is connected or connectable, via corresponding communication means, to a data base 830 in which fingerprint template data are and can be stored permanently. Transformed fingerprint template data as proposed herein is or can be stored in the data base 830 a well, but may also be stored on any suitable data carrier or in a data base different from the data base 830.

That is to say, from a functionality point of view, the computing device 800 can implement any of the here discussed functionalities or only one thereof or a combination thereof. For example, the computing device 800 may be just configured for capturing fingerprints in accordance with one of the well-known ISO/IEC or ANSI formats and to transform such fingerprint data into the here proposed transformed fingerprint template data. The result data can be stored in the data base 830 for later use.

Figure 2:
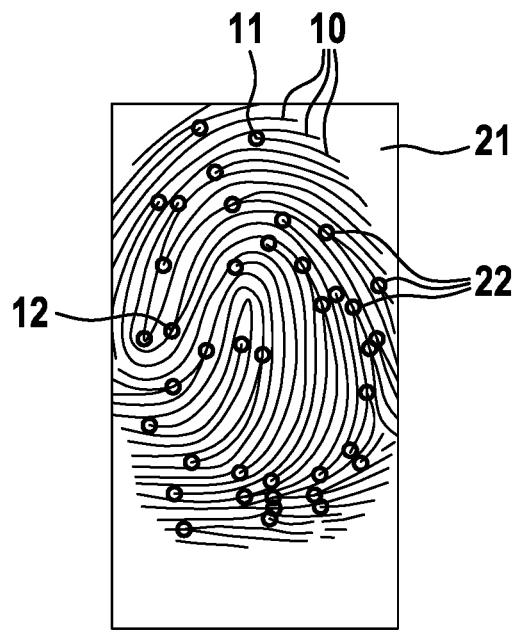
FIG. 2(a) shows a first fingerprint sample image as a reference fingerprint sample.
FIG. 2(b) shows a second fingerprint sample image which is another sample image captured from the same finger as for the first fingerprint sample image of FIG. 2(a).
FIG. 2(c) illustrate the construction of the herein proposed "mega-vicinity" MV as a basic element of the transformed representation for an arbitrary fingerprint minutia.
Figure 2:
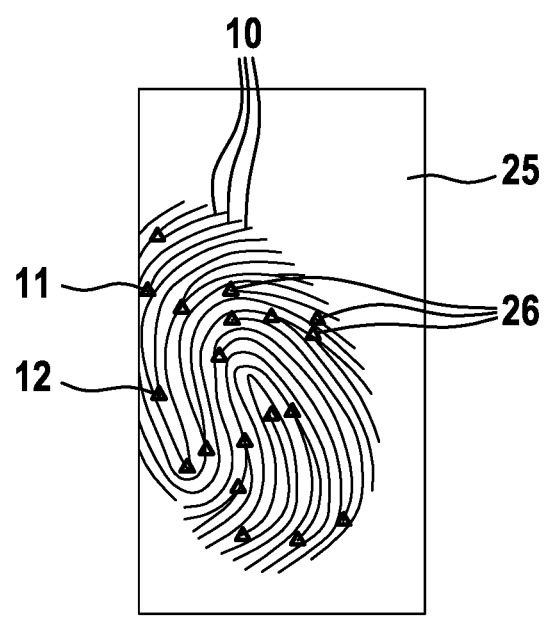
Figure 2:
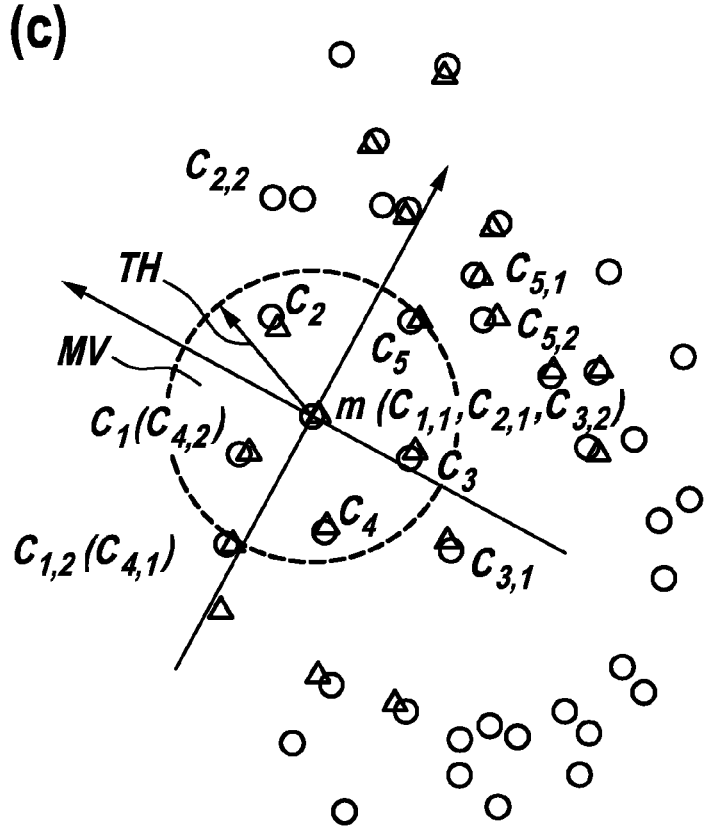

Moreover, the computing device 800 may be further or alternatively configured to compare fingerprint minutiae template data or transformed fingerprint template data in order to detect whether two fingerprints, such as the two exemplary fingerprints of FIGS. 2(*a*) and 2(*b*) are from the same individual or not. Alternatively, the computing device 800 may be further or alternatively configured to compare fingerprint template data with a plurality of fingerprint minutiae template data, e.g. stored in the data base 830, in order to check whether the individual to which the fingerprint belongs is already registered in the data base 830.

Additionally, or exclusively, as discussed in connection with FIGS. 4 to 6, the computing device 800 may be configured to protect generated or already existing fingerprint minutiae template data by means of the discussed biometric-secret-binding scheme for protecting the fingerprint minutiae template data for enhancing the privacy of the owners of the fingerprints. Consequently, the computing device 800 may also compare such protected fingerprint template data.

The computing device 800 may be: a secure login device to computer systems, user identification device at kiosks or automatic teller machines, biometric door locks, credit card terminals, identity authentication protocols and devices, weapon activation control devices, theft protection in any electronic apparatus.

Moreover, the computing device 800 comprises or is connected or is connectable to output device 840 such as at least one of a display device, a printing device, a storage device for data carriers ect.

Finally, is noted that the computing device 800 also comprises, as usual, input means for control of the device such as a keys, bottoms, or the like (not shown in FIG. 7). Such an input device can be also a combined input/output device, e.g. a touch screen. For example, the fingerprint capture device 810, the output device 840 may be such a combined input/out touch screen display which is adapted for fingerprint or handprint capturing as well.

The invention claimed is:

1. Computing device for processing fingerprint template data, wherein the computing device is configured for generating transformed fingerprint template data from original fingerprint minutiae template data, in which minutiae are represented at least by Cartesian or polar coordinates and an inherent minutiae direction, the computing device being configured to generate for each minutia of the original fingerprint minutiae template data corresponding mega-vicinity data, wherein the computing device for generating mega-vicinity data for a particular one minutia m comprises:
   a first module configured to define for the minutia m in the original fingerprint minutiae template data the corresponding mega-vicinity as a vicinity area surrounding the minutia m as the center;
   a second module configured to align geometrically all other minutiae inside the defined mega-vicinity with respect to the minutia m, wherein the minutia m defines the origin of a Cartesian and polar, respectively, coordinate system x-m-y, wherein the direction of the minutia m of the original fingerprint minutiae data defines the x-axis and the direction of the zero angle, respectively, of the Cartesian and polar, respectively, coordinate system;
   a third module configured to check for each other minutia in the original fingerprint minutiae data, if its location is within the vicinity area; and
   a fourth module configured to form the mega-vicinity data for the minutia m as comprising first layer data comprising all minutiae located inside the vicinity area and second layer data comprising the respective N closest neighboring minutiae around each of the minutiae in the first layer data, wherein N is a predetermined number.

2. The computing device of claim 1, wherein the computing device further comprises a fifth module configured to reduce the data size of the generated transformed fingerprint template data by quantizing the minutia data to limited discrete bins.

3. Computing device for processing two transformed fingerprint template data, in particular the computing device of claim 1, the computing device comprising a fingerprint comparator module being configured to compare the transformed fingerprint template data that comprises, for each minutia, mega-vicinity data, obtainable by the computing device of claim 1, of a first fingerprint and a second fingerprint, the comparator module being configured to
   (i) determine minutiae match cases in the first layer L1 of two aligned mega-vicinities from the first transformed fingerprint template data and the second transformed fingerprint template data, and
   (ii) compare, for each match case in the first layer L1, a predetermined number N of closest neighboring minutiae of the second layer L2 around each of the two matched minutiae, wherein N>0, and
   (iii) determine for each match case a comparison score.

4. The computing device of claim 3, wherein the fingerprint comparator module is further configured to combine the comparison scores of the comparison in the first layer L1 and the comparison scores of the comparison in the second layer L2 into a fused score for the two mega-vicinities.

5. The computing device of claim 4, wherein the fingerprint comparator module is further configured to weigh the fused comparison score by the sum of the distances from a matched minutia to its L neighbors, wherein L>0.

6. The computing device of one of the claim 5, wherein the fingerprint comparator module is further configured to generate a mega-vicinity comparison score for a mega-vicinity and to weigh the comparison score for a particular mega-vicinity by the ratio of the matched minutiae in the first layer L1 of the particular mega-vicinity and the total number of minutiae in the first layer.

7. The computing device of claim 6, wherein the fingerprint comparator module is further configured to generate a normalized final comparison score between the two transformed fingerprint templates by checking not only the highest comparison score between a probe mega-vicinity and a group of reference mega-vicinities, but also to check other non-highest comparison scores.

8. The computing device of claim 7, wherein the computing device further comprises a biometrics-secret binding module configured to encrypt plain mega-vicinity data into protected mega-vicinity data.

9. The computing device of claim 8, wherein the computing device is part of a control unit of one of the following devices from the group comprising: a secure login device to computer systems, user identification device at kiosks or automatic teller machines, biometric door locks, credit card terminals, identity authentication protocols and devices, weapon activation control devices, theft protection in any electronic apparatus.

10. The computing device of one of claim 9, wherein the computing device is arranged by corresponding hardware for at least one of: capturing fingerprint images, processing fingerprint images, extracting features from fingerprint images, generating transformed fingerprint template data from original fingerprint minutiae template data, storing fingerprint template data for comparison, and comparing or indexing fingerprint template data.

* * * * *